Jan. 18, 1949.     B. D. GREENSHIELDS     2,459,520
METHOD OF MIXING BITUMINOUS MATERIALS WITH FILLERS
Filed Aug. 22, 1944
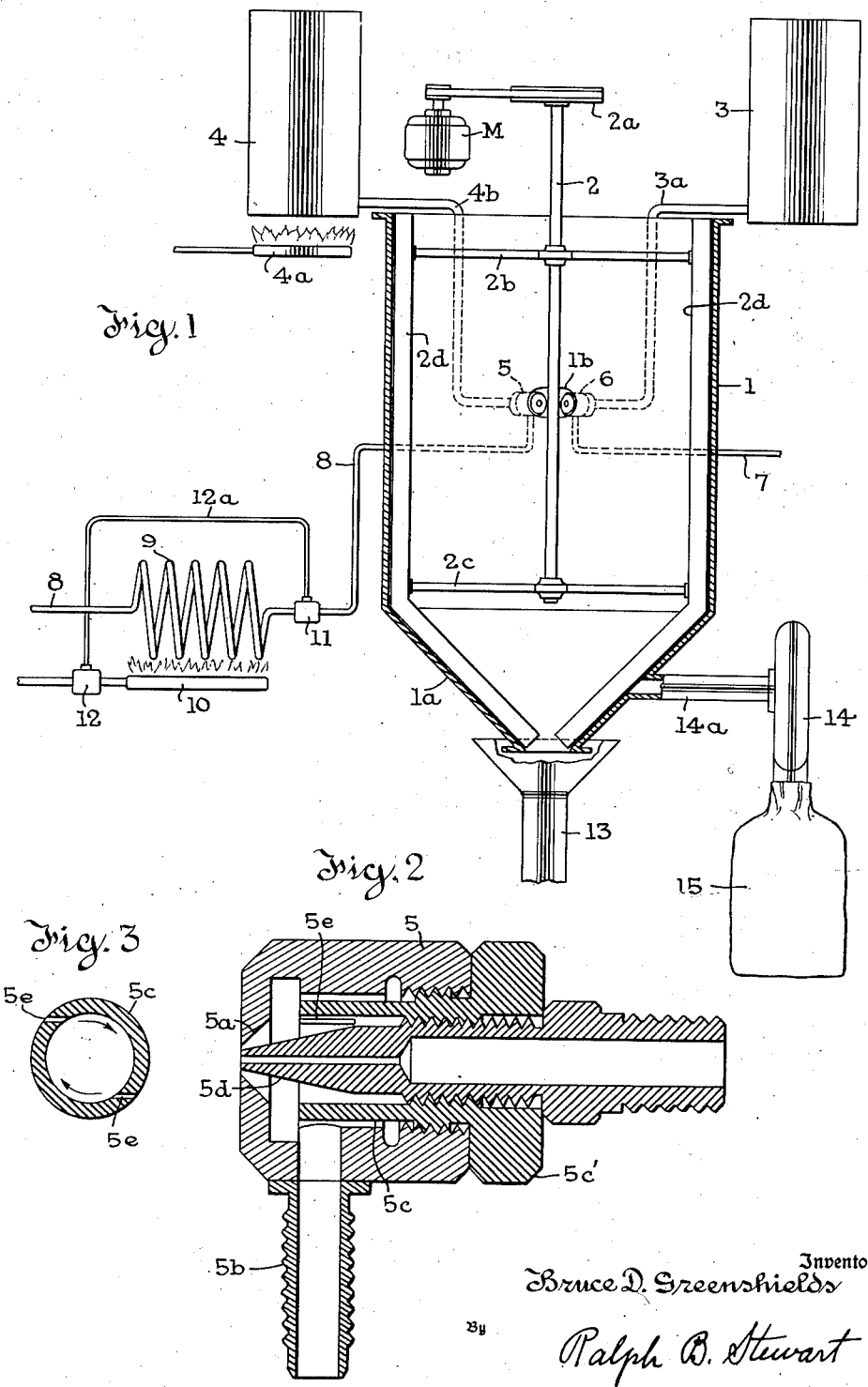
Inventor
Bruce D. Greenshields
By Ralph B. Stewart
Attorney Patented Jan. 18, 1949

2,459,520

UNITED STATES PATENT OFFICE 2,459,520

METHOD OF MIXING BITUMINOUS MATERIALS WITH FILLERS

Bruce D. Greenshields, New York, N. Y.

Application August 22, 1944, Serial No. 550,656

4 Claims. (Cl. 106—283)

1

This invention relates to a method of mixing bituminous materials with fillers.

The main object of the invention is to devise an improved method of securing an intimate and homogeneous mixture of bituminous material and fillers of any degree of fineness. The invention is especially useful for the preparation of paving or road-building materials, although it is not limited to this particular application.

My invention is especially concerned with the mixing of finely divided fillers with bituminous material to secure increased stability of the mixture when it is used as a paving material. A further advantage of my method is that it permits the use of softer asphalts which are less subject to temperature changes and to oxidation.

Still another advantage of my method is that it produces a bituminous mixture in a loose granular state which may be easily handled and stored cold and which may be laid and compacted into a dense, stable pavement by the application of pressure without heat. The mixture resulting from my process may also be used in the making of pavements by the hot-laid method.

Finally, the product of my improved method possesses certain advantages in mixing with a coarser aggregate, especially where the mixture is heated during mixing.

Various methods have been used in the past for mixing fine fillers with asphalt. The most common method has been to liquefy the bitumen by heat and then stir in the fillers by a pug-mill, but this method is not entirely satisfactory because the mixture is not entirely homogeneous and fatty spots develop in the pavement. Furthermore, the mixture is not easily handled.

Another commonly used method is to mix the filler with a bituminous emulsion or cut-back. This method is not entirely satisfactory because of the added cost due to the fact that the emulsion contains water and the cut-back a solvent which are not binders but which add to the cost and must be paid for.

Still another method employed for mixing bituminous materials and fillers involves atomizing hot bitumen into a cloud, and simultaneously spraying the finely divided dry filler into the cloud where the filler particles become intimately mixed with bitumen particles, the mixture being in the form of dust. This method is not entirely satisfactory because it is rather critical as to temperature and moisture conditions during processsing, and it is difficult to secure a mixture which contains enough soft bitumen to form a good stable pavement and which will not coalesce in warm weather.

2

My method of mixing overcomes many of the difficulties found in prior methods and produces a mixture which contains adequate bitumen for pavement use. Furthermore, the product of my method may be easily handled and it forms a highly stable pavement.

According to my invention, the bituminous material or other binder is first liquefied by heat and then is atomized or sprayed into a cloud. The fine filler material is mixed with water and formed into a slurry, and then the slurry is atomized or sprayed into a cloud which mingles with the bituminous cloud where the particles of slurry become coated with particles of bitumen. The coated particles are then collected and used for the formation of paving material in a manner to be described hereinafter.

One example of suitable apparatus for carrying out my improved method is illustrated in the accompanying drawing in which Figure 1 is a diagrammatic view of mixing apparatus with a mixing chamber being shown in vertical section;

Figure 2 is a sectional view of an atomizer; and

Figure 3 is an end view of one of the parts of the atomizer.

Referring to the drawing, 1 indicates a mixing chamber which preferably is in the form of a vertical cylinder, the upper end of which may be either open or closed. The lower end of the chamber 1 is provided with a conical portion 1a having a discharge opening in the bottom thereof. Mounted in the center of the chamber 1 is a rotary shaft 2 which extends out of the upper end of the chamber and is provided with a pulley 2a which is driven from any suitable source represented by the motor M. The shaft 2 carries an upper set of radial arms 2b and a lower set of arms 2c to the ends of which are secured a series of vertical scraper vanes 2d. As will be seen in Figure 1, each vane 2d is formed of a straight vertical section which engages the cylindrical portion of the mixing chamber and an inclined section at the lower end thereof which engages the inner surface of conical portion 1a. 3 indicates a supply tank for the slurry; 4 a supply tank for the bituminous material which is heated by a suitable burner 4a located beneath the tank 4, and liquid bitumen is supplied to an atomizer or spraying device 5 through connection 4b. Slurry from tank 3 is supplied to a second atomizer 6 through connection 3a. Compressed air is supplied to atomizer 6 from a suitable source through pipeline 7. Compressed air is also supplied to atomizer 5 through a suitable supply line 8, and the air supplied to this atomizer is heated by suitable means represented by the heating coil 9 interposed in the line 8 and heated by a suitable heater 10. 11 is a device which responds to the temperature of the air supplied to atomizer 5 and controls the fuel supply valve 12 in the supply line of burner 10 through connection 12*a* to maintain the air at a predetermined temperature.

Atomizing devices 5 and 6 are arranged on the outside of mixing chamber 1 and have their discharge ends directed into an opening 1*b* formed in the wall of the chamber. The two atomizers are arranged in angular position to direct an atomized cloud or fog of bitumen into the mixing chamber and also an atomized cloud or fog of slurry into the same space within the chamber. Various known constructions of atomizers may be employed, and one suitable construction is illustrated in Figures 2 and 3.

Referring to Figure 2, the atomizing device is formed of an outer casing 5 which has an internal bore threaded at the rear end and is provided with a conical shaped discharge opening 5*a* at the front end thereof. Compressed air is supplied to the bore of the housing 5 through a pipe coupling 5*b*. A sleeve 5*c* having a nut portion 5*c'* at the rear end thereof is threaded in the rear end of housing 5 and extends towards the front of the bore in the housing. An inner nozzle 5*d* having a conical outer surface at the front end is supported within sleeve 5*c* and has its forward end positioned within the conical nozzle 5*a* of housing 5 in the manner shown in Figure 2. The rear end of the nozzle 5*d* is provided with a pipe coupling through which the fluid to be atomized is supplied. For the purpose of giving the spray a swirling action, the front end of sleeve 5*c* is slotted at two or more places as shown at 5*e*, and these slots are arranged at an angle to the radius of the sleeve as shown in Figure 3. By this construction, the streams of air flowing through the slots 5*e* are given rotary or swirling action as shown by the arrows in Figure 3, and this swirling action continues after the spray leaves the atomizing device and tends to spread out or disperse the cloud or fog.

My improved method is carried out as follows: The finely divided filler material, such as stone dust, clay, Portland cement, or finely divided fibers of wood, asbestos or the like, is first mixed with water to form a slurry, and this may be accomplished by mixing in an ordinary pug-mill. The slurry thus formed is supplied to container 3 either continuously or in batches. The asphalt or other bituminous material is maintained in a liquid state in container 4 by means of burner 4*a* and is supplied to the inner nozzle of atomizer 5. The heated air supplied to atomizer 5 through line 8 atomizes the bitumen and projects a cloud or fog of atomized bitumen within the mixing chamber 1. Simultaneously, a cloud or fog of atomized slurry is injected into the same space within chamber 1 by atomizer 6. The two clouds are intimately mixed and the particles of slurry become coated with particles of atomized bitumen, and the coated particles either adhere to the wall of the mixing chamber or drop down and pass out through the discharge opening at the lower end thereof. Any particles which adhere to the walls of the mixing chamber are scraped off by scraper vanes 2*d* and fall by gravity and pass through the discharge opening. The mixed product passing through the discharge opening at the lower end of the mixing chamber consists of mineral fines and tar or asphalt and water. This mixture is a wet mass which may or may not be sticky depending upon the amount of water used. Preferably enough water is used to prevent the mass from being sticky, and this greatly facilitates the handling of the mixture.

In carrying out the method the asphalt or other binder should be heated to a temperature high enough to liquefy it, but not so high as to cause burning. Depending on the hardness of the bitumen, the temperature will vary from about 250 to 375° F. In case of gilsonite which liquefies at 375° F., the temperature is rather critical if burning is to be avoided. The temperature of the air supplied to the bitumen atomizer should be of the order of 250° F. or higher. The temperature of the slurry is not critical and may be the same as room temperature or the temperature of the available source of water, and under ordinary conditions the temperature of the slurry would range from about 50° F. to about 90° F.

The mixture discharged from the mixing chamber 1 passes into a conduit 13 by which the mass may be conveyed or conducted to storage or to a pug-mill where the coarser aggregates may be added for the purpose of making a pavement mixture.

The wet mass which is discharged from mixing chamber 1 may be easily handled, since the particles do not coalesce. The presence of the entrained water apparently prevents the particles from coalescing. At the same time, on drying, the cohesive action of the water on the mineral particles tends to draw the mass together and to squeeze the asphalt or bitumen and thus cause it to flow around and coat the mineral particles. It seems likely that the asphalt does not have actual contact with the particle until the water is forced out by pressure or is evaporated, either naturally or by heating.

For the purpose of withdrawing excess air from the mixing chamber, I provide an exhaust fan 14 having its inlet connected with the lower end of the chamber at 14*a*, and its outlet leading to a dust collector such as bag 15. This feature is not necessary unless a dry mixture is to be produced.

The wet mass obtained from the mixing chamber 1 may be incorporated in road material by mixing the mass with coarser aggregrate such as sand and gravel, and the mixing may be either in the cold state by adding a small amount of water, or the mixing may be facilitated by the application of heat to the mixture. Where heat is used, the mixture is heated to convert the water into steam which disperses the material and makes it easy for the mass to mix with the coarser aggregate. This method of mixing is quite effective, since steam is produced around each fine particle of the wet mass where it is most effective, it being remembered that the fine particles cause most of the difficulty in mixing. If it is desired to produce a hot-laid mixture, all or nearly all of the water should be driven off during mixing of the coarser aggregate, and if a cold-laid mixture is to be produced, a small percentage of the water should be left in the mixture to prevent coalescing.

While I have described my process as applied to bituminous materials, it is obvious that other binder materials may be used instead of or in addition to bituminous materials, such as resinous substances, either natural or synthetic. Also, the liquefied binder may be atomized by other types of devices than the air spray disclosed herein, such as by a pressure spray.

It will be obvious that other forms of apparatus may be devised for carrying out my improved process.

I claim:

1. The method of mixing bituminous material with finely divided filler which consists in forming a water slurry of the filler material, atomizing the slurry into a cloud, heating the bituminous material to liquefy the same, atomizing the liquid bitumen by an air spray heated to a temperature of the order of 250° F., and introducing a cloud of said atomized bitumen into the same space with the atomized slurry cloud.

2. The method of forming a non-coalescing mixture of bitumen and finely divided filler material which consists in forming a water slurry of the filler material at room temperature, atomizing the slurry into a cloud, heating the bitumen to liquefy the same, atomizing the liquid bitumen by a spray of air heated to a temperature of the order of 250° F., and introducing a cloud of said atomized bitumen into the same space with the atomized slurry.

3. The method of forming a paving mixture which consists in forming a water slurry of finely divided filler material, forming an atomized cloud of said slurry, forming an atomized cloud of bituminous material in the same space with the cloud of slurry, collecting the wet mass of particles deposited from said clouds, and mixing said mass with coarser aggregate while heating the same to a temperature above the boiling point of water.

4. The method of mixing bituminous materials with finely divided filler which consists in forming a water slurry of the filler material at a temperature less than 90° F., atomizing the slurry into a cloud, heating the bituminous material to liquefy the same, atomizing the liquid bituminous material by an air spray heated to a temperature of the order of 250° F., and introducing a cloud of said atomized bituminous material into the same space with the atomized slurry cloud.

BRUCE D. GREENSHIELDS.

REFERENCES CITED

The following references are of record in the file of this patent:

UNITED STATES PATENTS

| Number | Name | Date |
|---|---|---|
| 1,727,231 | Downard | Sept. 3, 1929 |
| 1,781,105 | Downard | Nov. 11, 1930 |
| 1,854,100 | Brito | Apr. 12, 1932 |
| Re. 20,119 | Sommer | Sept. 22, 1936 |
| 2,125,860 | Sommer | Aug. 2, 1938 |
| 2,372,230 | Sommer | Mar. 27, 1945 |

FOREIGN PATENTS

| Number | Country | Date |
|---|---|---|
| 470,878 | Great Britain | Aug. 24, 1937 |
| 13,583/28 | Australia | 1929 |